(12) United States Patent
Murata et al.

(10) Patent No.: US 11,679,729 B2
(45) Date of Patent: Jun. 20, 2023

(54) POWER DISTRIBUTION APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Hayaki Murata, Yokkaichi (JP); Akio Ishihara, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/413,399

(22) PCT Filed: Nov. 25, 2019

(86) PCT No.: PCT/JP2019/045964
§ 371 (c)(1),
(2) Date: Jun. 11, 2021

(87) PCT Pub. No.: WO2020/121792
PCT Pub. Date: Jun. 18, 2020

(65) Prior Publication Data
US 2022/0032866 A1    Feb. 3, 2022

(30) Foreign Application Priority Data
Dec. 12, 2018 (JP) .............................. JP2018-232915

(51) Int. Cl.
*B60R 16/033* (2006.01)
(52) U.S. Cl.
CPC .................................. *B60R 16/033* (2013.01)

(58) Field of Classification Search
CPC ...................................................... B60R 16/033
(Continued)

(56) References Cited

U.S. PATENT DOCUMENTS

2013/0069431 A1*  3/2013  Tseng ...................... H02J 7/342
                                                              307/43
2018/0251067 A1*  9/2018  Elliott ................ H04N 5/23206
(Continued)

FOREIGN PATENT DOCUMENTS

| JP | 2000-102139 A | 4/2000 |
| JP | 2017-52473 A | 3/2017 |
| WO | WO2017141686 * | 8/2017 ........... B60R 16/033 |

OTHER PUBLICATIONS

International Search Report, Application No. PCT/JP2019/045964, dated Feb. 18, 2020. ISA/Japan Patent Office.

*Primary Examiner* — Michael R. Fin
(74) *Attorney, Agent, or Firm* — Honigman LLP (57) ABSTRACT

Provided is a power distribution apparatus that can be shared by vehicles having different configurations related to power supply. The power distribution apparatus distributes power supplied from a battery mounted in a vehicle to a plurality of loads mounted in the vehicle and connected to a power line connected to the battery and a plurality of power lines connected to the plurality of loads, the apparatus including: a first power supply path that is to be electrically connected to the power line connected to the battery and a power line connected to a first system load mounted in the vehicle; and a second power supply path that is not to be connected to the power line connected to the battery, and is to be electrically connected to a power line connected to a second system load mounted in the vehicle.

13 Claims, 7 Drawing Sheets

(58) Field of Classification Search
USPC .................................................. 307/10.1
See application file for complete search history.

(56) References Cited

U.S. PATENT DOCUMENTS

2018/0354436 A1* 12/2018 Sato .................. H02H 7/18
2021/0066956 A1* 3/2021 Izawa ................. B60L 3/04

* cited by examiner

| | Vehicle that does not have automated driving function | Vehicle that has automated driving function |
|---|---|---|
| A | Steer-by-wire apparatus (main)<br><br>Steer-by-wire apparatus (sub)<br><br>Right headlamp<br><br>Left headlamp<br><br>⋮ | Steer-by-wire apparatus (main)<br>Right headlamp<br>⋮<br><br>Steer-by-wire apparatus (sub)<br>Left headlamp<br>⋮ |
| B | | LiDAR<br>⋮<br><br>Camera<br>⋮ |

Legend
A= General function
B= Automated driving function

POWER DISTRIBUTION APPARATUS

CROSS-REFERENCE TO RELATED APPLICATIONS

This application is the U.S. national stage of PCT/JP2019/045964 filed on Nov. 25, 2019, which claims priority of Japanese Patent Application No. JP 2018-232915 filed on Dec. 12, 2018, the contents of which are incorporated herein.

TECHNICAL FIELD

The present disclosure relates to a power distribution apparatus for distributing power supplied from a battery of a vehicle, to a plurality of loads.

BACKGROUND

In vehicles, a power distribution apparatus called a "power source box" or the like is provided between a battery and a plurality of in-vehicle apparatuses (loads) in order to supply power accumulated in the battery to the in-vehicle apparatuses. The power distribution apparatus is connected to a power line through which power is supplied from the battery, and power lines for supplying power to the loads. These power lines are arranged in the vehicle as appropriate. The power distribution apparatus distributes power supplied from the battery, to the plurality of loads.

JP 2017-52473A proposes an in-vehicle power source apparatus in which power supply from a secondary battery to the outside is unlikely to be hindered by a malfunction and the like of a primary battery. In this in-vehicle power source apparatus, the primary battery and the secondary battery are connected by a conducting portion that can be switched between a conductive state and a non-conductive state. The conducting portion is normally in the conductive state, and is switched from the conductive state to the non-conductive state due to a voltage drop of the primary battery.

Recent years have seen research and development widely conducted on automated driving functions of vehicles. The number of apparatuses mounted in vehicles is different between a vehicle that has an automated driving function and a vehicle that does not have the automated driving function. Also, in a vehicle that has the automated driving function, it is conceivable that a plurality of batteries are mounted to provide redundancy to power supply, in order to increase resistance to a malfunction and the like of a battery. When a plurality of batteries are mounted in a vehicle, it is desirable that redundant power supply is also provided for an in-vehicle apparatus related to a function different from the automated driving function. In this manner, a configuration for power supply is different between a vehicle that has the automated driving function and a vehicle that does not have the automated driving function, and thus power distribution apparatuses suitable for the respective vehicles are required.

However, it is conceivable that vehicles that have the automated driving function and vehicles that do not have the automated driving function, both being vehicles of the same vehicle type, are manufactured through development in different variations, grades, and the like. In such a case, it is desirable that as many apparatuses, components, and the like as possible are shared between the vehicles.

The present disclosure has been made in view of such circumstances, and aims to provide a power distribution apparatus that is relatively easily shared even by vehicles that have different configurations related to power supply.

SUMMARY

A power distribution apparatus according to one aspect of the present disclosure is a power distribution apparatus for distributing power supplied from a battery mounted in a vehicle to a plurality of loads mounted in the vehicle by being connected to a power line connected to the battery and a plurality of power lines connected to the plurality of loads, the apparatus including: a first power supply path that is to be electrically connected to the power line connected to the battery and a power line connected to a first system load mounted in the vehicle; and a second power supply path that is not to be connected to the power line connected to the battery, and is to be electrically connected to a power line connected to a second system load mounted in the vehicle.

Advantageous Effects of Disclosure

According to the above aspect, the same power distribution apparatus can be relatively easily shared even by vehicles that have different configurations related to power supply.

DETAILED DESCRIPTION OF PREFERRED EMBODIMENTS

First, embodiments of the present disclosure will be listed and described. At least some of the embodiments to be described below may be suitably combined.

A power distribution apparatus according to one aspect of the present disclosure is a power distribution apparatus for distributing power supplied from a battery mounted in a vehicle to a plurality of loads mounted in the vehicle by being connected to a power line connected to the battery and a plurality of power lines connected to the plurality of loads, the apparatus including: a first power supply path that is to be electrically connected to the power line connected to the battery and a power line connected to a first system load mounted in the vehicle; and a second power supply path that is not to be connected to the power line connected to the battery, and is to be electrically connected to a power line connected to a second system load mounted in the vehicle.

In this aspect, the power distribution apparatus is connected to the power line connected to the battery of the vehicle, the power line connected to the first system load of the vehicle, and the power line connected to the second system load of the vehicle. The power distribution apparatus includes the first power supply path that is to be electrically connected to the power line connected to the battery and the power line connected to the first system load. The power distribution apparatus also includes the second power supply path that is not to be connected to the power line connected to the battery, and is to be electrically connected to the power line connected to the second system load. The first power supply path and the second power supply path are not electrically connected.

That is to say, the power distribution apparatus according to this aspect has a configuration in which the first system load is electrically connected to the battery, and the second system load is not electrically connected to the battery. For example, in the case of a vehicle in which both the first system load and the second system load are connected to the battery, it suffices for the first power supply path and the second power supply path of the power distribution apparatus to be electrically connected. In addition, for example, in the case of a vehicle in which the first system load is connected to a battery and the second system load is connected to a second battery, it suffices for the second battery to be connected to the second power supply path of the power distribution apparatus. As a result of the power distribution apparatus having a configuration in which the second system load is not connected to the battery in this manner, the same power distribution apparatus can be easily shared even by vehicles that have different configurations related to power supply.

It is preferred that an attachment portion for attaching a conduction apparatus for conductively connecting the first power supply path and the second power supply path is provided.

In this aspect, the power distribution apparatus includes the attachment portion for attaching the conduction apparatus for conductively connecting the first power supply path and the second power supply path. As a result of attaching the conduction apparatus to the power distribution apparatus, it is possible to conductively connect the first power supply path and the second power supply path, and electrically connect the battery and the second system load.

It is preferred that an attachment portion for attaching an additional distribution apparatus that includes a third power supply path that is to be electrically connected to a power line connected to a second battery mounted in the vehicle is provided, and, when the additional distribution apparatus is attached to the attachment portion, the second power supply path and the third power supply path are conductively connected.

In this aspect, the power distribution apparatus includes the attachment portion for attaching the additional distribution apparatus that is connected to the power line connected to the second battery of the vehicle. The additional distribution apparatus includes the third power supply path that is to be electrically connected to the power line connected to the second battery.

When the additional distribution apparatus is attached to the power distribution apparatus, the second power supply path of the power distribution apparatus and the third power supply path of the additional distribution apparatus are conductively connected. Accordingly, the second system load and a third system load are connected to the second battery of the vehicle. Thus, as a result of attaching the additional distribution apparatus to the power distribution apparatus, it is possible to appropriately distribute power of the two batteries mounted in the vehicle to a plurality of loads.

It is preferred that the third power supply path of the additional distribution apparatus is connected to a third system load mounted in the vehicle, the additional distribution apparatus includes a fourth power supply path that is not to be connected to the power line connected to the second battery, and is to be electrically connected to a power line connected to a fourth system load mounted in the vehicle, and, when the additional distribution apparatus is attached to the attachment portion, the first power supply path and the fourth power supply path are conductively connected.

In this aspect, a power line connected to the third system load of the vehicle and a power line connected to the fourth system load of the vehicle are connected to the additional distribution apparatus. The third power supply path of the additional distribution apparatus is electrically connected to the power line connected to the third system load. In addition, the additional distribution apparatus includes the fourth power supply path that is not to be connected to the power line connected to the second battery, and is to be electrically connected to the power line connected to the fourth system load. The third power supply path and the fourth power supply path are not electrically connected.

When the additional distribution apparatus is attached to the power distribution apparatus, the first power supply path of the power distribution apparatus and the fourth power supply path of the additional distribution apparatus are conductively connected, and the second power supply path of the power distribution apparatus and the third power supply path of the additional distribution apparatus are conductively connected. Accordingly, the first system load and the fourth system load are connected to the battery of the vehicle, and the second system load and the third system load are connected to the second battery. Thus, as a result of the additional distribution apparatus being attached to the power distribution apparatus, it is possible to appropriately distribute power of the two batteries mounted in the vehicle to a plurality of loads.

It is preferred that an attachment portion for selectively attaching either a conduction apparatus for conductively connecting the first power supply path and the second power supply path, or an additional distribution apparatus that includes a third power supply path that is to be electrically connected to a power line connected to the second battery mounted in the vehicle and a power line connected to a third system load mounted in the vehicle, and a fourth power supply path that is not to be connected to the power line connected to the second battery, and is to be electrically connected to a power line connected to a fourth system load mounted in the vehicle is provided, and, when the additional distribution apparatus is attached to the attachment portion, the first power supply path and the fourth power supply path are conductively connected, and the second power supply path and the third power supply path are conductively connected.

In this aspect, it is possible to selectively attach either the conduction apparatus or the additional distribution apparatus, which have been described above, to the attachment portion of the power distribution apparatus. Accordingly, as a result of selectively attaching either the conduction apparatus or the additional distribution apparatus to the power distribution apparatus in accordance with a vehicle configuration related to power supply, even vehicles that have different configurations related to power supply can be dealt with, and thus such vehicles can share a power distribution apparatus that has the same configuration.

It is preferred that the third system load and the fourth system load are loads related to automated driving of the vehicle.

In this aspect, the third system load and the fourth system load that are connected to the additional distribution apparatus are loads related to automated driving of the vehicle. Accordingly, regarding a vehicle that does not have an automated driving function, as a result of connecting loads related to a function other than the automated driving function to the power distribution apparatus and attaching the conduction apparatus to the power distribution apparatus, it is possible to supply power supplied from the battery, to the loads of the vehicle. Regarding a vehicle that has the automated driving function, as a result of attaching, to the power distribution apparatus, the additional distribution apparatus to which a load related to automated driving is connected, it is possible to supply power supplied from two batteries, to the first and fourth system loads of the vehicle and the second and third system loads of the vehicle, respectively.

It is preferred that the additional distribution apparatus includes a switch for switching between conduction and non-conduction of the third power supply path and the fourth power supply path, and a control unit that performs control for making the switch conductive in accordance with an abnormality being detected on the third power supply path or the fourth power supply path.

In this aspect, the additional distribution apparatus is provided with the switch for switching between conduction and non-conduction of the third power supply path and the fourth power supply path, and the switch is made conductive in accordance with an abnormality being detected in the third power supply path or the fourth power supply path. Accordingly, for example, when power supply is suspended due to a malfunction of the battery or the second battery of the vehicle, power from the battery or second battery that is not malfunctioning can be supplied to the first to fourth system loads.

It is preferred that a switch for switching between conduction and non-conduction of the first power supply path and the second power supply path, and a control unit that performs control for making the switch conductive in accordance with an abnormality being detected on the first power supply path or the second power supply path are provided.

In this aspect, the power distribution apparatus is provided with the switch for switching between conduction and non-conduction of the first power supply path and the second power supply path, and the switch is made conductive in accordance with an abnormality being detected on the first power supply path or the second power supply path. Accordingly, for example, when power supply is suspended due to a malfunction of the battery or the second battery of the vehicle, power from the battery or second battery that is not malfunctioning can be supplied to the first to fourth system loads.

Specific examples of a power distribution apparatus according to embodiments of the present disclosure will be described below with reference to the drawings. Note that the present disclosure is not limited to illustrations of these, but is indicated by the claims, and all changes that come within the meaning and range of equivalency of the claims are intended to be embraced therein.

First Embodiment

Figure 1:
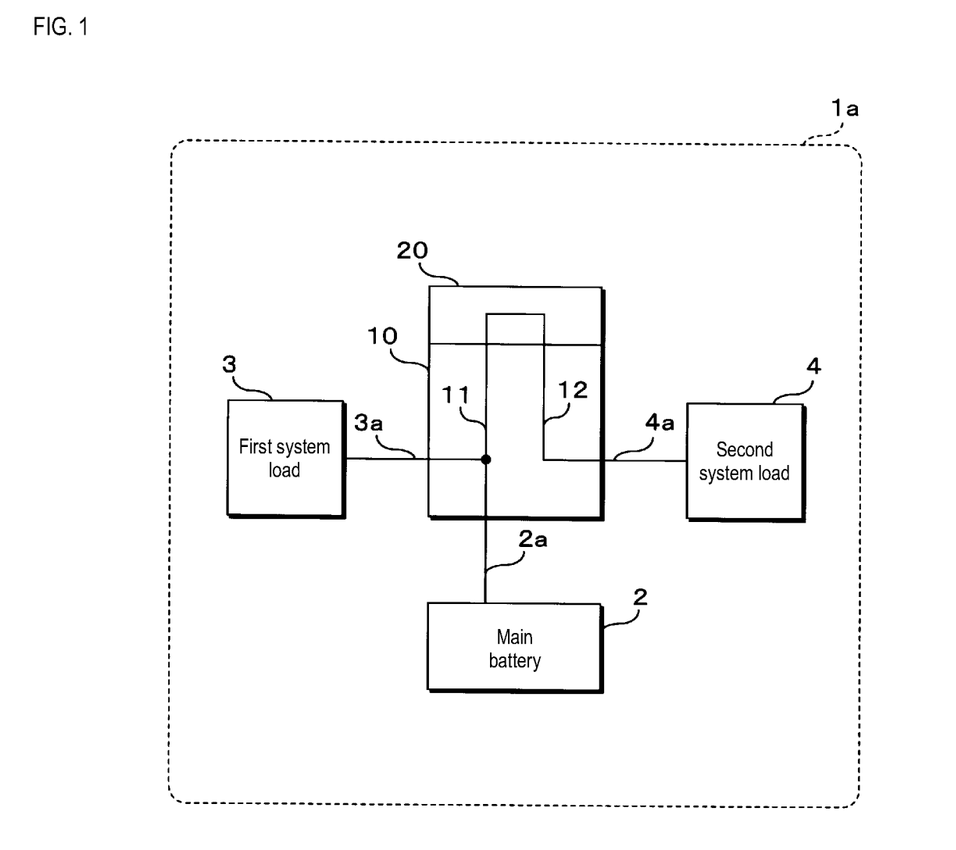
FIG. 1 is a schematic diagram for illustrating an overview of an in-vehicle power supply system according to an embodiment of the present disclosure.
Figure 2:
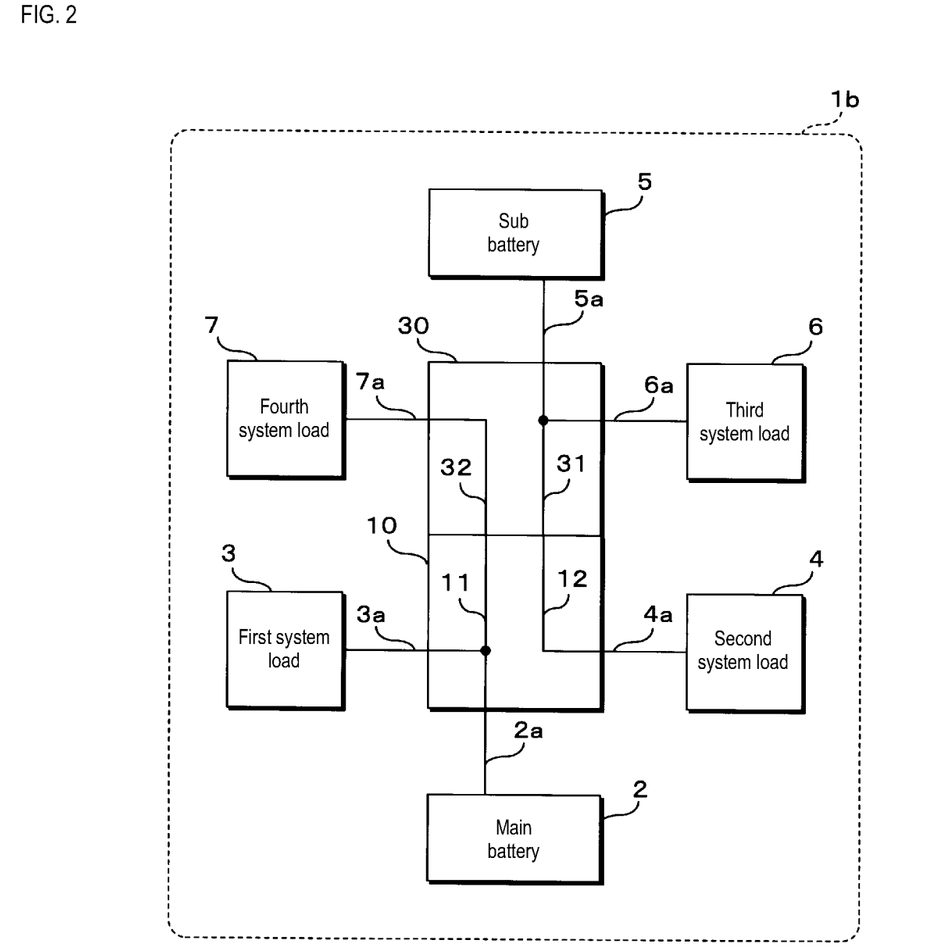
FIG. 2 is a schematic diagram for illustrating an overview of an in-vehicle power supply system according to an embodiment of the present disclosure.

FIGS. 1 and 2 are schematic diagrams for illustrating an overview of an in-vehicle power supply system according to this embodiment. FIG. 1 shows an example of an in-vehicle power supply system that is mounted in a vehicle 1a that does not have an automated driving function, and FIG. 2 shows an example of an in-vehicle power supply system that is mounted in a vehicle 1b that has an automated driving function. As shown in FIG. 1, the in-vehicle power supply system mounted in the vehicle 1a that does not have the automated driving function is constituted by a main battery 2, a first system load 3, a second system load 4, a power source box 10, and a first ad on box 20. The main battery 2 is connected to the power source box 10 via a power line 2a, the first system load 3 is connected to the power source box 10 via a power line 3a, and the second system load 4 is connected to the power source box 10 via a power line 4a.

The main battery 2 is a power storage apparatus such as a lead battery or a lithium-ion battery. Power generated by a generator such as an alternator mounted in the vehicle 1a accumulates in the main battery 2, which supplies power to loads of the vehicle 1a when the generator is not operating. Examples of the first system load 3 and the second system load 4 include various electrical apparatuses mounted in the vehicle 1a, such as an ECU (Electronic Control Unit), a gateway, a sensor, a light, and an actuator. Note that FIGS. 1 and 2 each illustrate one first system load 3 and one second system load, but, in actuality, there are a plurality of first system loads 3 and a plurality of second system loads 4. These loads may be connected to the power source box 10 via individual power lines, or may also be connected to the power source box 10 via a shared power line.

The power source box 10 is an apparatus for distributing power supplied from the main battery 2 connected via the power line 2a, to the first system load 3 connected via the power line 3a and the second system load 4 connected via the power line 4a. The power source box 10 is provided with a first power supply path 11 that electrically connects the power line 2a extending from the main battery 2 and the power line 3a extending to the first system load 3, and a second power supply path 12 that is not connected to the power line 2a extending from the main battery 2 and is electrically connected to the power line 4a extending to the second system load 4. In the power source box 10, the first power supply path 11 and the second power supply path 12 are not electrically connected.

When using the power source box 10 according to this embodiment, an ad on box needs to be attached to the power source box 10. There may be a plurality of types of ad on boxes, and one of these plurality of types of ad on boxes is selectively attached to the power source box 10. The first ad on box 20 shown in FIG. 1 is provided with a conduction path 21 that conductively connects the first power supply path 11 and the second power supply path 12 of the power source box 10. As a result of the first ad on box 20 being attached to the power source box 10, the first power supply path 11 and the second power supply path 12 are electrically connected via the conduction path 21. Accordingly, power from the main battery 2 is supplied to the second system load 4.

As shown in FIG. 2, the in-vehicle power supply system mounted in the vehicle 1b that has an automated driving function is constituted by a main battery 2, a first system load 3, a second system load 4, a sub battery 5, a third system load 6, a fourth system load 7, a power source box 10, and a second ad on box 30. The power source box 10, the main battery 2, the first system load 3, and the second system load 4, which are connected to the power source box 10, are the same as those of the in-vehicle power supply system shown in FIG. 1. The in-vehicle power supply system shown in FIG. 2 has a configuration in which the second ad on box 30 is attached to the power source box 10 in place of the first ad on box 20 of the in-vehicle power supply system shown in FIG. 1. The sub battery 5 is connected to the second ad on box 30 via a power line 5a, the third system load 6 is connected to the second ad on box 30 via a power line 6a, and the fourth system load 7 is connected to the second ad on box 30 via a power line 7a.

The sub battery 5 is a power storage apparatus such as a lead battery or a lithium-ion battery, and may have a configuration similar to the main battery 2, or may also have a configuration different from the main battery 2. Examples of the third system load 6 and the fourth system load 7 include electrical apparatuses for realizing the automated driving function, such as a sensor, a camera, and a control apparatus, the apparatuses being mounted in the vehicle 1b. Note that FIG. 2 illustrates one third system load 6 and one fourth system load 7, but, in actuality, there are a plurality of third system loads 6 and a plurality of fourth system loads 7. These loads may be connected to the second ad on box 30 via individual power lines, or may also be connected to the second ad on box 30 via a shared power line.

The second ad on box 30 is used attached to the power source box 10. The second ad on box 30 is provided with a third power supply path 31 that electrically connects the power line 5a extending from the sub battery 5 and the power line 6a extending to the third system load 6 and a fourth power supply path 32 that is not connected to the power line 5a extending from the sub battery 5 and is electrically connected to the power line 7a extending to the fourth system load 7. In the second ad on box 30, the third power supply path 31 and the fourth power supply path 32 are not electrically connected.

As a result of the second ad on box 30 being attached to the power source box 10, the first power supply path 11 of the power source box 10 and the fourth power supply path 32 of the second ad on box 30 are electrically connected, and the second power supply path 12 of the power source box 10 and the third power supply path 31 of the second ad on box 30 are electrically connected. Accordingly, power from the main battery 2 is supplied to the first system load 3 and the fourth system load 7, and power from the sub battery 5 is supplied to the second system load 4 and the third system load 6.

Figure 3:
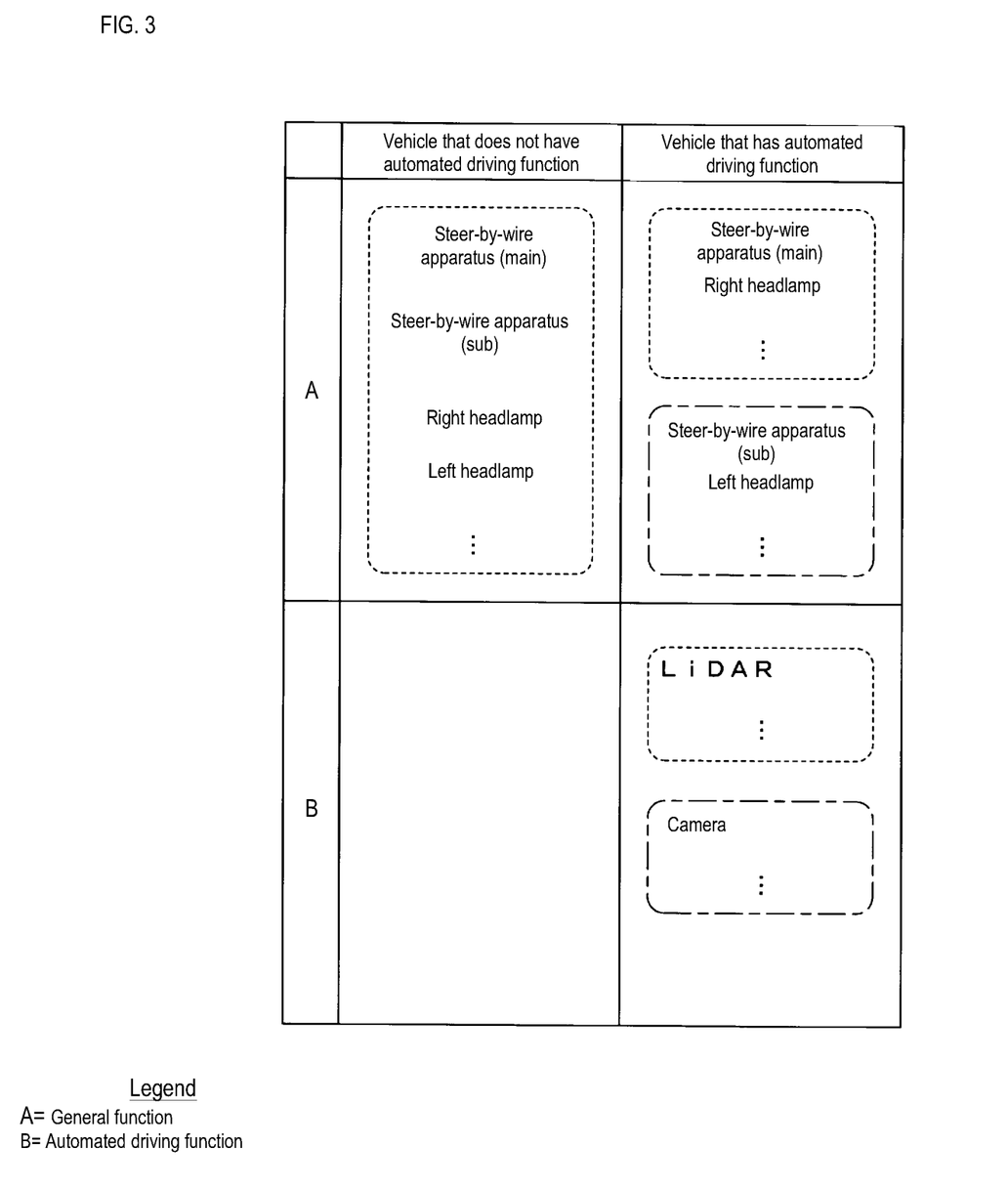
FIG. 3 is a table showing examples of first to fourth system loads.

FIG. 3 is a table showing examples of the first system load 3 to the fourth system load 7. Note that, in the table shown in FIG. 3, functions enclosed by broken lines are loads that receive power supply from the main battery 2, and functions enclosed by dashed-dotted lines are loads that receive power supply from the sub battery 5. In the illustrated example, loads such as a steer-by-wire apparatus (main), a steer-by-wire apparatus (sub), a right headlamp, and a left headlamp are provided as loads of general functions shared between the vehicle 1a that does not have the automated driving function and the vehicle 1b that has the automated driving function. Note that the illustrated loads of general functions are exemplary, and a load other than these may also be mounted in the vehicles 1a and 1b.

A steer-by-wire apparatus is an apparatus that detects an operation performed by the driver on the steering wheel of the vehicle 1a or 1b, and steers the vehicle 1a or 1b in accordance with the detected operation. In the illustrated example, two steer-by-wire apparatuses, namely a main and a sub steer-by-wire apparatus are provided in each of the vehicles 1a and 1b, and this aims to compensate for an operation when a malfunction or the like occurs in one of the apparatuses. When at least one of the two steer-by-wire apparatuses is operating, steering of the vehicle 1a or 1b is performed. The headlamps irradiate the surroundings on the front side of the vehicles 1a and 1b, and are provided on the left and right sides of the vehicles 1a and 1b.

One main battery 2 is mounted in the vehicle 1a that does not have the automated driving function, and main and sub steer-by-wire apparatuses and right and left headlamps are connected to the main battery 2, and operate by receiving power from the main battery 2. In contrast, two batteries, namely the main battery 2 and the sub battery 5 are mounted in the vehicle 1b that has the automated driving function. Regarding the two steer-by-wire apparatuses, for example, the main steer-by-wire apparatus is connected to the main battery 2 and the sub steer-by-wire apparatus is connected to the sub battery 5 such that, even when one of the steer-by-wire apparatuses cannot operate due to a malfunction or the like occurring in one of the batteries, the other steer-by-wire apparatus can operate. Similarly, also regarding the right and left headlamps, for example, the right headlamp is connected to the main battery 2 and the left headlamp is connected to the sub battery 5 such that, even when one of the headlamps cannot operate due to a malfunction or the like occurring in one of the batteries, the other headlamp can operate.

Accordingly, if the loads of general functions shown in FIG. 3 are applied to the system configurations shown in FIGS. 1 and 2, the main steer-by-wire apparatus and the right headlamp correspond to the first system load 3, and the sub steer-by-wire apparatus and the left headlamp correspond to the second system load 4.

FIG. 3 also shows loads such as a LiDAR (Light Detection And Ranging) and a camera that are provided as loads of the automated driving function mounted in the vehicle 1b that has the automated driving function. Note that the illustrated loads of the automated driving function are exemplary, and a load other than these may also be mounted in the vehicle 1b. The LiDAR is a sensor that measures the distance from a target object, for example, by emitting a laser beam and detecting reflection waves, and a plurality of LiDARs may be mounted in the vehicle 1b. The camera is an apparatus that captures an image of the surroundings of the vehicle 1b. The LiDAR and camera are apparatuses for detecting another vehicle, a person, an object, and the like in the surroundings of the vehicle 1b in order to perform automated driving of the vehicle 1b. These loads are not mounted in the vehicle 1a that does not have the automated driving function.

Even when a malfunction or the like occurs in one of the main battery 2 and the sub battery 5 mounted in the vehicle 1b, the operation of the automated driving function of the vehicle 1b needs to continue. Both the LiDAR and the camera are apparatuses for detecting an object in the surroundings of the vehicle 1b, and one of the LiDAR and the camera can compensate for the other. In view of this, in this example, a configuration is adopted in which the LiDAR and the camera are connected to different batteries. For example, the LiDAR is connected to the main battery 2 and the camera is connected to the sub battery 5.

That is to say, if the loads of the automated driving function shown in FIG. 3 are applied to the system configuration shown in FIG. 2, the LiDAR corresponds to the fourth system load 7, and the camera corresponds to the third system load 6.

Figure 4:
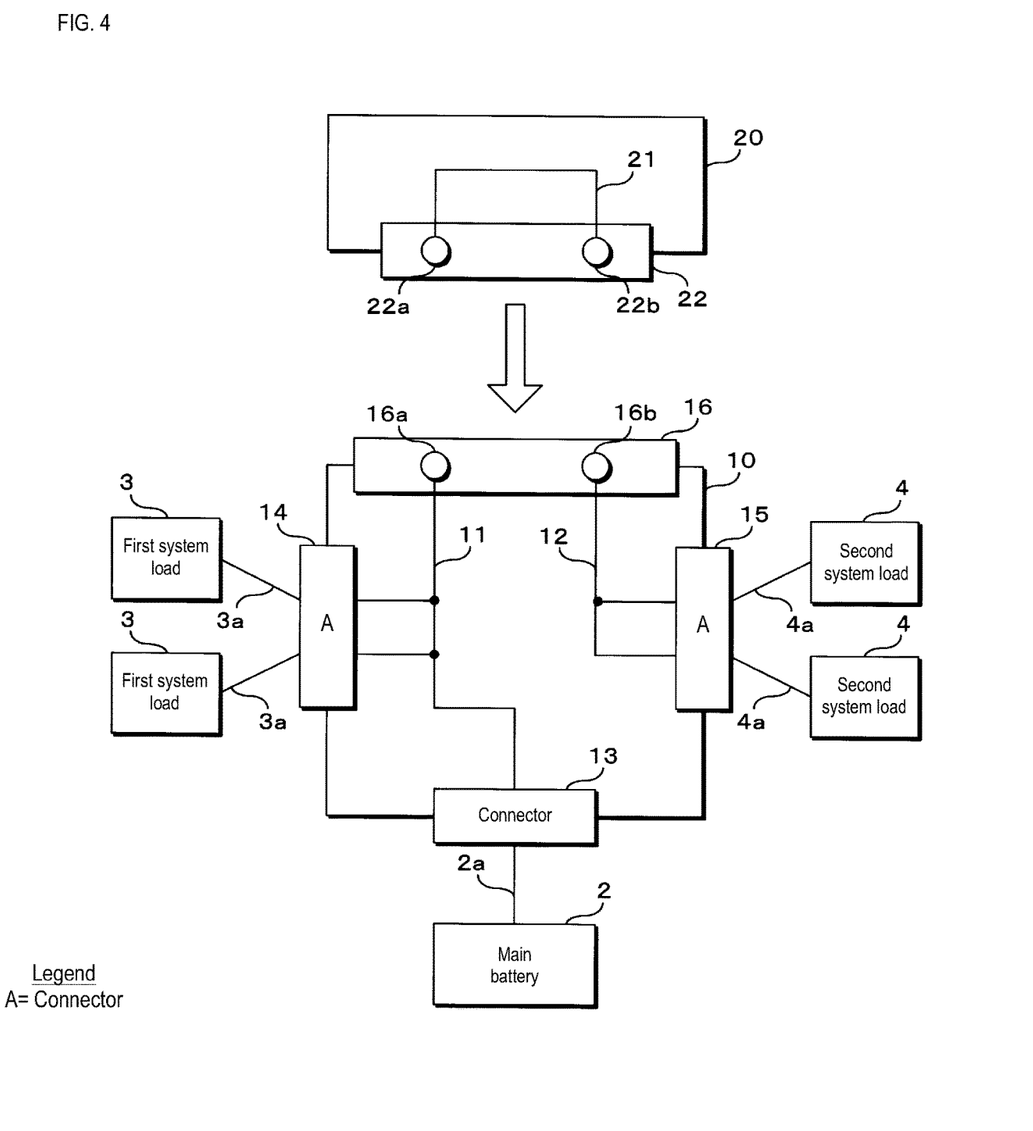
FIG. 4 is a block diagram showing a configuration of a power source box and a first ad on box according to an embodiment of the present disclosure.

FIG. 4 is a block diagram showing a configuration of the power source box 10 and the first ad on box 20 according to this embodiment. The power source box 10 according to this embodiment includes connectors 13 to 15 for respectively connecting the power lines 2a, 3a, and 4a, and an attachment portion 16 for attaching the first ad on box 20 or the second ad on box 30. The connector 13 is detachably connected to the power line 2a extending from the main battery 2. The connector 14 is detachably connected to one or more power lines 3a extending to one or more first system loads 3. The connector 15 is detachably connected to one or more power lines 4a extending to one or more second system loads 4. Note that, in the illustrated example, two first system loads 3 and two second system loads 4 are shown, but the number of first system loads 3 and the number of second system loads 4 may be one, or three or higher. In addition, substantially one connector may be used as the connectors 13 to 15 that are individually provided in the power source box 10.

It is possible to selectively attach one of the first ad on box 20 and the second ad on box 30 using the attachment portion 16. The attachment portion 16 includes two terminals 16a and 16b for electrical connection to the first ad on box 20 or the second ad on box 30. In the power source box 10, one of the terminals, namely the terminal 16a is electrically connected to the connectors 13 and 14 via the first power supply path 11. The other terminal, namely the terminal 16b is electrically connected to the connector 15 via the second power supply path 12.

The first ad on box 20 according to this embodiment includes an attachment portion 22 for attaching the first ad on box 20 to the attachment portion 16 of the power source box 10. The attachment portion 22 includes two terminals 22a and 22b that are respectively connected to the two terminals 16a and 16b provided on the attachment portion 16 of the power source box 10. In the first ad on box 20, the two terminals 22a and 22b are electrically connected via the conduction path 21.

The attachment portion 16 of the power source box 10 and the attachment portion 22 of the first ad on box 20 are attached in the form of engagement, for example, and the power source box 10 and the first ad on box 20 may also be permanently fixed through screwing, welding, or the like. When the first ad on box 20 is attached to the power source box 10, the terminal 16a of the power source box 10 and the terminal 22a of the first ad on box 20 are electrically connected, and the terminal 16b of the power source box 10 and the terminal 22b of the first ad on box 20 are electrically connected.

Accordingly, when the first ad on box 20 is attached to the power source box 10, the first power supply path 11 and the second power supply path 12 of the power source box 10 are electrically connected via the conduction path 21 of the first ad on box 20. Power from the main battery 2 of the vehicle 1a is supplied to the second system loads 4 via the power line 2a, the connector 13 of the power source box 10, the first power supply path 11, the terminal 16a of the attachment portion 16, the terminal 22a of the attachment portion 22 of the first ad on box 20, the conduction path 21, the terminal 22b, the terminal 16b of the attachment portion 16 of the power source box 10, the second power supply path 12, the connector 15, and the power lines 4a. Power from the main battery 2 is also supplied to the first system loads 3 via the power line 2a, the connector 13 of the power source box 10, the first power supply path 11, the connector 14, and the power lines 3a.

Figure 5:
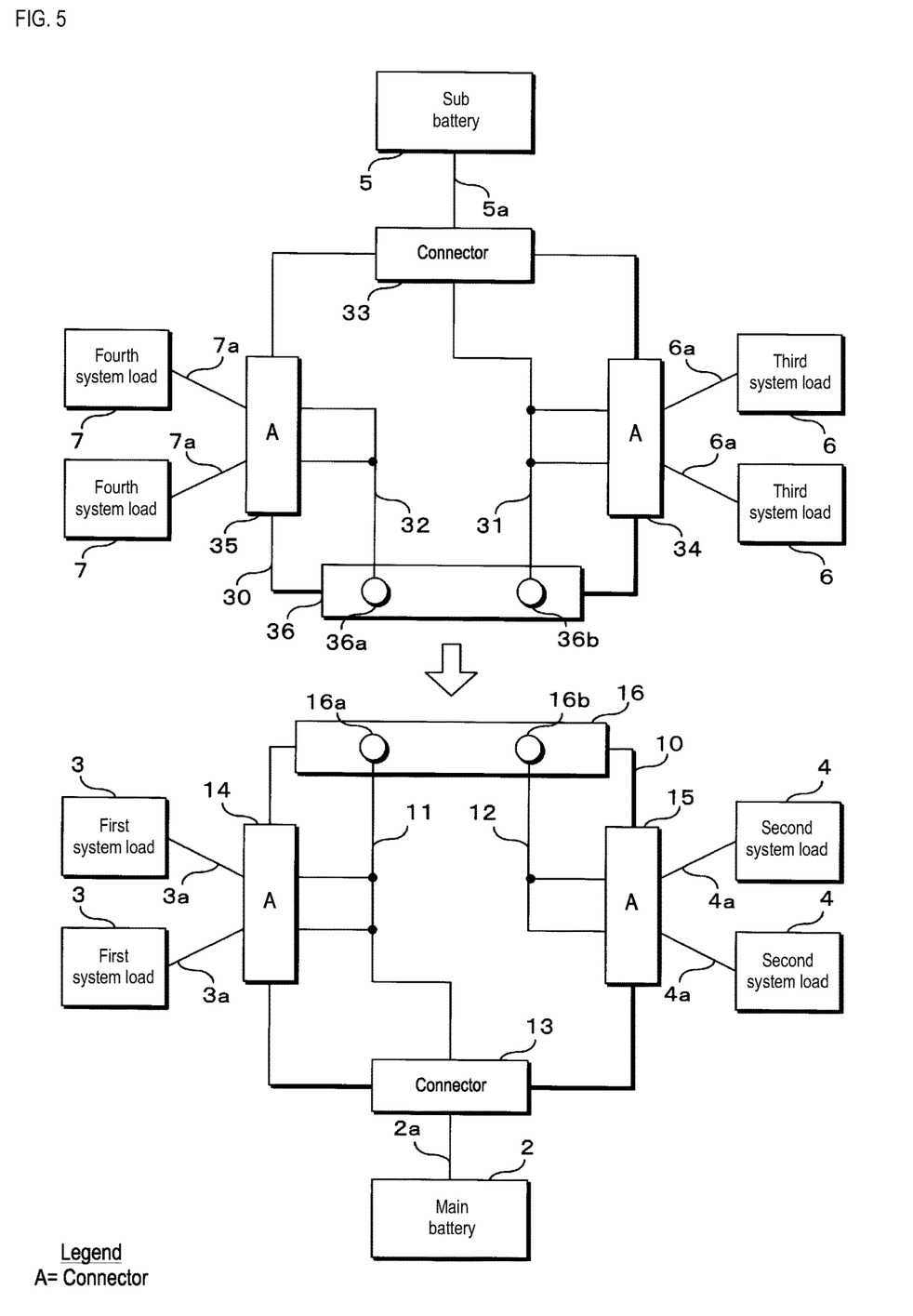
FIG. 5 is a block diagram showing a configuration of a power source box and a second ad on box according to an embodiment of the present disclosure.

FIG. 5 is a block diagram showing a configuration of the power source box 10 and the second ad on box 30 according to this embodiment. Note that the configuration of the power source box 10 shown in FIG. 5 is the same as the configuration of the power source box 10 shown in FIG. 4. The second ad on box 30 according to this embodiment includes connectors 33 to 35 for respectively connecting power lines 5a, 6a, and 7a and an attachment portion 36 for attaching the second ad on box 30 to the attachment portion 16 of the power source box 10. The power line 5a extending from the sub battery 5 is detachably connected to the connector 33. One or more power lines 6a extending to one or more third system loads 6 are detachably connected to the connector 34. One or more power lines 7a extending to one or more fourth system loads 7 are detachably connected to the connector 35. Note that the illustrated example shows two third system loads 6 and two fourth system loads 7, but the number of third system loads 6 and the number of fourth system loads 7 may be one, three or higher. In addition, substantially one connector may be used as the connectors 33 to 35 that are individually provided in the second ad on box 30.

The attachment portion 36 of the second ad on box 30 includes two terminals 36a and 36b that are connected to the two terminals 16a and 16b provided on the attachment portion 16 of the power source box 10. In the second ad on box 30, one of the terminals, namely the terminal 36a is electrically connected to the connector 35 via the fourth power supply path 32. The other terminal, namely the terminal 36b is electrically connected to the connectors 33 and 34 via the third power supply path 31.

The attachment portion 16 of the power source box 10 and the attachment portion 36 of the second ad on box 30 are attached in the form of engagement, for example, and the power source box 10 and the second ad on box 30 may also be permanently fixed through screwing, welding, or the like. When the second ad on box 30 is attached to the power source box 10, the terminal 16a of the power source box 10 and the terminal 36a of the second ad on box 30 are electrically connected, and the terminal 16b of the power source box 10 and the terminal 36b of the second ad on box 30 are electrically connected.

Accordingly, when the second ad on box 30 is attached to the power source box 10, the first power supply path 11 of the power source box 10 and the fourth power supply path 32 of the second ad on box 30 are electrically connected via the terminal 16a of the attachment portion 16 and the terminal 36a of the attachment portion 36. Also, the second power supply path 12 of the power source box 10 and the third power supply path 31 of the second ad on box 30 are electrically connected via the terminal 16b of the attachment portion 16 and the terminal 36b of the attachment portion 36. Power from the main battery 2 of the vehicle 1b is supplied to the fourth system loads 7 via the power line 2a, the connector 13 of the power source box 10, the first power supply path 11, the terminal 16a of the attachment portion 16, the terminal 36a of the attachment portion 36 of the second ad on box 30, the fourth power supply path 32, the connector 35, and the power lines 7a. Also, power from the main battery 2 is supplied to the first system loads 3 via the power line 2a, the connector 13 of the power source box 10, the first power supply path 11, the connector 14, and the power lines 3a.

In addition, power from the sub battery 5 of the vehicle 1b is supplied to the second system loads 4 via the power line 5a, the connector 33 of the second ad on box 30, the third power supply path 31, the terminal 36b of the attachment portion 36, the terminal 16b of the attachment portion 16 of the power source box 10, the second power supply path 12, the connector 15, and the power lines 4a. Also, power from the sub battery 5 is supplied to the third system loads 6 via the power line 5a, the connector 33, the third power supply path 31, the connector 34, and the power lines 6a.

In the in-vehicle power supply system according to this embodiment that has the above-described configuration, the power line 2a connected to the main battery 2 of each of the vehicles 1a and 1b, the power lines 3a connected to the first system loads 3, and the power lines 4a connected to the second system loads 4 are connected to the power source box 10. The power source box 10 includes the first power supply path 11 that is to be electrically connected to the power line 2a connected to the main battery 2 and the power lines 3a connected to the first system loads 3. The power source box 10 also includes the second power supply path 12 that is not to be connected to the power line 2a connected to the main battery 2 and is to be electrically connected to the power lines 4a connected to the second system loads 4. The first power supply path 11 and the second power supply path 12 are not electrically connected.

That is to say, the power source box 10 according to this embodiment electrically connects the first system loads 3 to the main battery 2, and does not electrically connect the second system loads 4 to the main battery 2. For example, in the case of the vehicle 1a in which both the first system loads 3 and the second system loads 4 are connected to the main battery 2, it suffices for the first power supply path 11 and the second power supply path 12 of the power source box 10 to be electrically connected. Also, for example, in the case of the vehicle 1b in which the first system loads 3 are connected to the main battery 2, and the second system loads 4 are connected to the sub battery 5, it suffices for the second power supply path 12 of the power source box 10 to be connected to the sub battery 5. As a result of adopting a configuration in which the power source box 10 does not connect the second system loads 4 to the main battery 2 in this manner, the same power source box 10 can be more easily shared even by the vehicles 1a and 1b that have different configurations related to power supply.

In addition, the power source box 10 according to this embodiment includes the attachment portion 16 for attaching the first ad on box 20 for conductively connecting the first power supply path 11 and the second power supply path 12. As a result of attaching the first ad on box 20 to the power source box 10, the first power supply path 11 and the second power supply path 12 are conductively connected, and it is possible to electrically connect the main battery 2 and the second system loads 4.

In addition, the power source box 10 according to this embodiment includes the attachment portion 16 for attaching the second ad on box 30 to which the power line 5a connected to the sub battery 5 of the vehicle 1b, the power lines 6a connected to the third system loads 6, and the power lines 7a connected to the fourth system loads 7 are connected. The second ad on box 30 includes the third power supply path 31 that is to be electrically connected to the power line 5a connected to the sub battery 5 and the power lines 6a connected to the third system loads 6. The second ad on box 30 includes the fourth power supply path 32 that is not to be connected to the power line 5a connected to the sub battery 5 and is to be electrically connected to the power lines 7a connected to the fourth system loads 7. The third power supply path 31 and the fourth power supply path 32 are not electrically connected.

When the second ad on box 30 is attached to the power source box 10, the first power supply path 11 of the power source box 10 and the fourth power supply path 32 of the second ad on box 30 are conductively connected, and the second power supply path 12 of the power source box 10 and the third power supply path 31 of the second ad on box 30 are conductively connected. That is to say, the first system loads 3 and the fourth system loads 7 are connected to the main battery 2 of the vehicle 1b, and the second system loads 4 and the third system loads 6 are connected to the sub battery 5. Thus, as a result of attaching the second ad on box 30 to the power source box 10, it is possible to appropriately distribute power of the main battery 2 and the sub battery 5 mounted in the vehicle 1b, to a plurality of loads.

In addition, it is possible to selectively attach, to the attachment portion 16 of the power source box 10 according to this embodiment, one of the first ad on box 20 and the second ad on box 30 that have been described above. Accordingly, as a result of selectively attaching one of the first ad on box 20 and the second ad on box 30 to the power source box 10 in accordance with each configuration, even the vehicles 1a and 1b that have different configurations related to power supply can be dealt with, and thus the different vehicles 1a and 1b can share the power source box 10 that has the same configuration.

In addition, in the in-vehicle power supply system according to this embodiment, the third system loads 6 and the fourth system loads 7 that are connected to the second ad on box 30 are loads related to the automated driving function of the vehicle 1b, such as LiDARs and cameras. Accordingly, regarding the vehicle 1a that does not have the automated driving function, as a result of connecting loads related to a function other than the automated driving function to the power source box 10, and attaching the first ad on box 20 to the power source box 10, power supplied from the main battery 2 can be supplied to loads of the vehicle 1a. Regarding the vehicle 1b that has the automated driving function, as a result of attaching, to the power source box 10, the second ad on box 30 to which loads related to the automated driving function are connected, power supplied from the main battery 2 and the sub battery 5 can be supplied to the first system loads 3 and the fourth system loads 7, and the second system loads 4 and the third system loads 6 respectively.

Note that, in this embodiment, an apparatus that conductively connects the first power supply path 11 and the second power supply path 12 of the power source box 10 is the first ad on box 20, but the first ad on box 20 does not necessarily need to take the form of a box, and, for example, the apparatus may also be a metal fitting such as a metal rod that conductively connects the first power supply path 11 and the second power supply path 12, or may also take a form other than those. In addition, the first ad on box 20 or the second ad on box 30 may be attached to the power source box 10 at the manufacturing stage of the power source box 10, and the power source box 10 that has the first ad on box 20 or the second ad on box 30 attached thereto can be sold as a power source box. In addition, in this embodiment, an apparatus for distributing power from a battery to a load is a power source box, but this apparatus can be called another name such as a "junction box".

Second Embodiment

Figure 6:
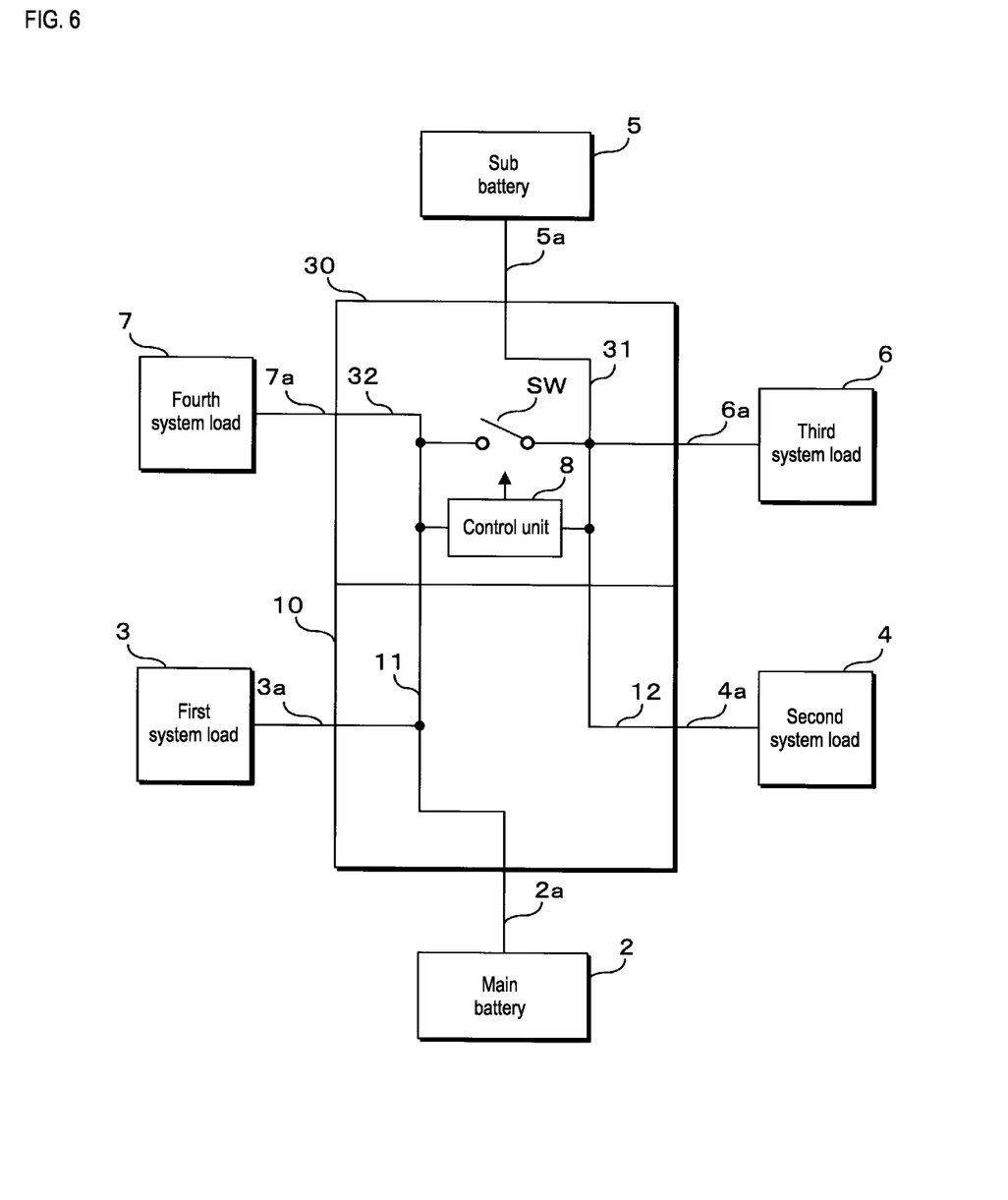
FIG. 6 is a schematic diagram showing a configuration of an in-vehicle power supply system according to a second embodiment.

FIG. 6 is a schematic diagram showing a configuration of an in-vehicle power supply system according to a second embodiment. In the in-vehicle power supply system according to the second embodiment, the power source box 10 and the first ad on box 20 have the same configurations as the first embodiment, but the configuration of the second ad on box 30 is different from the first embodiment. The second ad on box 30 according to the second embodiment includes a switch SW provided between the third power supply path 31 and the fourth power supply path 32 and a control unit 8 that performs control of switching between energization and deenergization of this switch SW. As a result of the switch SW being switched to an energized state, the third power supply path 31 and the fourth power supply path 32 of the second ad on box 30 are electrically connected.

The control unit 8 measures the voltage values, current values, or the like of the third power supply path 31 and the fourth power supply path 32, and performs processing for detecting an abnormality in the third power supply path 31 or the fourth power supply path 32 based on the measurement result. For example, when the voltage value of a power supply path is lower than a threshold value, the control unit 8 can determine that an abnormality has occurred on this power supply path. The control unit 8 performs control so as to disconnect the switch SW when no abnormality has occurred on the third power supply path 31 and the fourth power supply path 32, and to make the switch SW conductive when an abnormality is detected on the third power supply path 31 or the fourth power supply path 32.

Note that the control unit 8 is constituted by a microcontroller, for example. The control unit 8 operates by receiving power supplied from both the third power supply path 31 and the fourth power supply path 32, and, even when an abnormality has occurred on one of the power supply paths, if there is no abnormality on the other power supply path, the control unit 8 can control the switch SW. The control unit 8 may also include a voltage conversion circuit that converts a voltage value of power supplied from each of the main battery 2 and the sub battery 5 into a voltage value suitable for operations of the microcontroller and the like.

In the in-vehicle power supply system according to the second embodiment that has the above-described configuration, the second ad on box 30 includes the switch SW for switching between energization and deenergization of the third power supply path 31 and the fourth power supply path 32, and the control unit 8 makes the switch SW conductive in accordance with abnormality detection on the third power supply path 31 or the fourth power supply path 32. Accordingly, for example, when power supply is suspended due to a malfunction of one of the main battery 2 and the sub battery 5 of the vehicle 1b, power from the main battery 2 or the sub battery 5 that is not malfunctioning can be supplied to the first system load 3, the second system load 4, the third system load 6, and the fourth system load 7.

Note that, according to the second embodiment, the second ad on box 30 is provided with the control unit 8 that performs control of switching between energization and deenergization of the switch SW, but there is no limitation thereto, and a configuration may also be adopted in which the switch SW is switched between energization and deenergization in accordance with control performed by an external apparatus outside of the second ad on box 30.

Other configurations of the in-vehicle power supply system according to the second embodiment are similar to the in-vehicle power supply system according to the first embodiment, and thus the same reference numerals are assigned to the same constituent elements, and a detailed description thereof is omitted.

Third Embodiment

Figure 7:
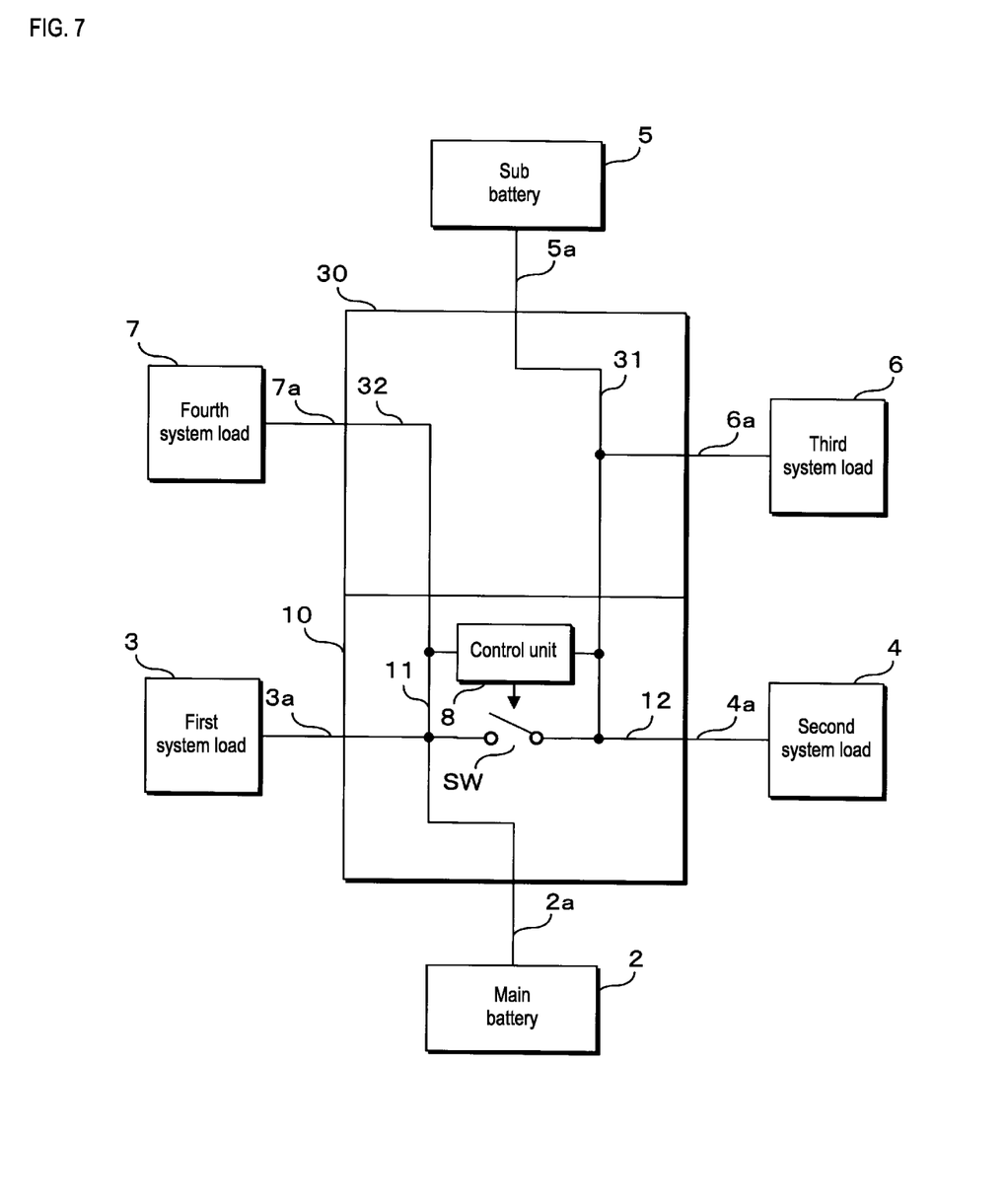
FIG. 7 is a schematic diagram showing a configuration of an in-vehicle power supply system according to a third embodiment.

FIG. 7 is a schematic diagram showing a configuration of an in-vehicle power supply system according to a third embodiment. In the in-vehicle power supply system according to the third embodiment, the power source box 10 is provided with the switch SW and the control unit 8. The power source box 10 according to the third embodiment includes the switch SW provided between the first power supply path 11 and the second power supply path 12, and the control unit 8 that performs control of switching between energization and deenergization of this switch SW. As a result of the switch SW being switched to an energized state, the first power supply path 11 and the second power supply path of the power source box 10 are electrically connected.

The control unit 8 measures voltage values, current values, or the like of the first power supply path 11 and the second power supply path 12, and detects an abnormality on the first power supply path 11 or the second power supply path 12 based on the measurement result. The control unit 8 performs control so as to disconnect the switch SW when no abnormality has occurred on the first power supply path 11 and the second power supply path 12, and to make the switch SW conductive when an abnormality is detected on the first power supply path 11 or the second power supply path 12.

Note that FIG. 7 illustrates a configuration in which the second ad on box 30 is attached to the power source box 10, and is mounted in the vehicle 1b that has the automated driving function, but the power source box 10 can also be mounted in the vehicle 1a that does not have the automated driving function. In a case where the power source box 10 is mounted in the vehicle 1a that does not have the automated driving function, the second ad on box 30 is not attached to the power source box 10, and the first power supply path 11 and the second power supply path 12 of the power source box 10 are in a conductive state. In the power source box 10 according to the first and second embodiments, the first ad on box 20 needs to be attached in order to conductively connect the first power supply path 11 and the second power supply path 12.

In contrast, in the power source box 10 according to the third embodiment, as a result of the switch SW being switched to a conductive state, it is possible to conductively connect the first power supply path 11 and the second power supply path 12, and thus the first ad on box 20 does not need to be attached. The control unit 8 of the power source box 10 according to the third embodiment has two operation modes, namely a first mode and a second mode, and accepts setting of an operation mode, using a DIP switch provided in the power source box 10, for example.

The first mode is an operation mode that is set when the power source box 10 is mounted in the vehicle 1a that does not have the automated driving function. When the first mode is set, the control unit 8 constantly maintains the switch SW in an energized state to conductively connect the first power supply path 11 and the second power supply path 12.

The second mode is an operation mode that is set when the power source box 10 is mounted in the vehicle 1a that has the automated driving function, in other words when the second ad on box 30 is attached. When the second mode is set, the control unit 8 performs control for switching between energization and deenergization of the switch SW in accordance with abnormality detection on the first power supply path 11 and the second power supply path 12, as described above.

In the in-vehicle power supply system according to the third embodiment that has the above-described configuration, the power source box 10 includes the switch SW for switching between conduction and non-conduction of the first power supply path 11 and the second power supply path 12, and makes the switch SW conductive in accordance with abnormality detection on the first power supply path 11 or the second power supply path 12. Accordingly, for example, when power supply is suspended due to a malfunction of one of the main battery 2 and the sub battery 5 of the vehicle 1b, power from the main battery 2 or the sub battery 5 that is not malfunctioning can be supplied to the first system load 3, the second system load 4, the third system load 6, and the fourth system load 7.

In addition, the control unit 8 for switching between energization and deenergization of the switch SW accepts setting of an operation mode, namely the first mode or the second mode. When the first mode is set, the control unit 8 maintains the switch SW in the energized state. When the second mode is set, the control unit 8 performs control for switching between energization and deenergization of the switch SW in accordance with abnormality detection on the first power supply path 11 and the second power supply path 12. Accordingly, when the second ad on box 30 is not attached, the power source box 10 can maintain the first power supply path 11 and the second power supply path 12 in a conductive state, and the first ad on box 20 is unnecessary.

Other configurations of the in-vehicle power supply system according to the third embodiment are similar to the in-vehicle power supply system according to the second embodiment, and thus the same reference numerals are assigned to the same constituent elements, and a detailed description thereof is omitted.

Each apparatus in an in-vehicle power supply system includes a computer constituted by a microprocessor, a ROM, a RAM, and the like. A computation processing unit such as a microprocessor reads out a computer program for realizing a portion or the entirety of the above-described processing, from a storage unit such as a ROM or a RAM, and executes the computer program. Computer programs of these apparatuses can be installed from an external server apparatus or the like. Also, computer programs of these apparatuses are distributed in a state of being stored in a recording medium such as a CD-ROM, a DVD-ROM, or a semiconductor memory.

The embodiments disclosed herein are to be considered as illustrative and non-limiting in all aspects. The scope of the present disclosure is indicated not by the above-stated meanings but by the claims, and all changes that come within the meaning and range of equivalency of the claims are intended to be embraced therein.

The invention claimed is:

1. A power distribution apparatus for distributing power supplied from a battery mounted in a vehicle to a plurality of loads mounted in the vehicle by being connected to a power line connected to the battery and a plurality of power lines connected to the plurality of loads, the apparatus comprising:
a first power supply path that is to be electrically connected to the power line connected to the battery and a power line connected to a first system load mounted in the vehicle;
a second power supply path that is not to be connected to the power line connected to the battery, and is to be electrically connected to a power line connected to a second system load mounted in the vehicle; and
an attachment portion for attaching an additional distribution apparatus that includes a third power supply path that is to be electrically connected to a power line connected to a second battery mounted in the vehicle,
wherein, when the additional distribution apparatus is attached to the attachment portion, the second power supply path and the third power supply path are conductively connected.

2. The power distribution apparatus according to claim 1, further comprising:
an attachment portion for attaching a conduction apparatus for conductively connecting the first power supply path and the second power supply path.

3. The power distribution apparatus according to claim 1, further comprising:
an attachment portion for selectively attaching either a conduction apparatus for conductively connecting the first power supply path and the second power supply path, or an additional distribution apparatus that includes a third power supply path that is to be electrically connected to a power line connected to the second battery mounted in the vehicle and a power line connected to a third system load mounted in the vehicle, and a fourth power supply path that is not to be connected to the power line connected to the second battery, and is to be electrically connected to a power line connected to a fourth system load mounted in the vehicle,
wherein, when the additional distribution apparatus is attached to the attachment portion, the first power supply path and the fourth power supply path are conductively connected, and the second power supply path and the third power supply path are conductively connected.

4. The power distribution apparatus according to claim 3, wherein the third system load and the fourth system load are loads related to automated driving of the vehicle.

5. The power distribution apparatus according to claim 3, wherein the additional distribution apparatus includes a switch for switching between conduction and non-conduction of the third power supply path and the fourth power supply path, and
a control unit that performs control for making the switch conductive in accordance with an abnormality being detected on the third power supply path or the fourth power supply path.

6. The power distribution apparatus according to claim 1, further comprising:
a switch for switching between conduction and non-conduction of the first power supply path and the second power supply path; and
a control unit that performs control for making the switch conductive in accordance with an abnormality being detected on the first power supply path or the second power supply path.

7. The power distribution apparatus according to claim 3, wherein the third system load and the fourth system load are loads related to automated driving of the vehicle.

8. The power distribution apparatus according to claim 3, wherein the additional distribution apparatus includes a switch for switching between conduction and non-conduction of the third power supply path and the fourth power supply path, and a control unit that performs control for making the switch conductive in accordance with an abnormality being detected on the third power supply path or the fourth power supply path.

9. The power distribution apparatus according to claim 4, wherein the additional distribution apparatus includes a switch for switching between conduction and non-conduction of the third power supply path and the fourth power supply path, and a control unit that performs control for making the switch conductive in accordance with an abnormality being detected on the third power supply path or the fourth power supply path.

10. The power distribution apparatus according to claim 2, further comprising:

a switch for switching between conduction and non-conduction of the first power supply path and the second power supply path; and a control unit that performs control for making the switch conductive in accordance with an abnormality being detected on the first power supply path or the second power supply path.

11. The power distribution apparatus according to claim 3, further comprising:

a switch for switching between conduction and non-conduction of the first power supply path and the second power supply path; and a control unit that performs control for making the switch conductive in accordance with an abnormality being detected on the first power supply path or the second power supply path.

12. The power distribution apparatus according to claim 4, further comprising:

a switch for switching between conduction and non-conduction of the first power supply path and the second power supply path; and a control unit that performs control for making the switch conductive in accordance with an abnormality being detected on the first power supply path or the second power supply path.

13. The power distribution apparatus according to claim 5, further comprising:

a switch for switching between conduction and non-conduction of the first power supply path and the second power supply path; and a control unit that performs control for making the switch conductive in accordance with an abnormality being detected on the first power supply path or the second power supply path.

\* \* \* \* \*